(12) United States Patent
Redding

(10) Patent No.: US 7,064,167 B2
(45) Date of Patent: Jun. 20, 2006

(54) AEROSOL PAINT COMPOSITION FOR ADHERENCE TO PLASTIC

(75) Inventor: Patricia L. Redding, South Euclid, OH (US)

(73) Assignee: The Sherwin-Williams Company, Cleveland, OH (US)

(*) Notice: Subject to any disclaimer, the term of this patent is extended or adjusted under 35 U.S.C. 154(b) by 223 days.

(21) Appl. No.: 10/637,155

(22) Filed: Aug. 8, 2003

(65) Prior Publication Data

US 2004/0127605 A1 Jul. 1, 2004

Related U.S. Application Data

(60) Provisional application No. 60/402,859, filed on Aug. 10, 2002.

(51) Int. Cl.
*C08L 67/06* (2006.01)
(52) U.S. Cl. .................. 525/169; 206/524.1; 524/513; 524/519
(58) Field of Classification Search ................ 525/169; 524/513, 519; 206/524.1
See application file for complete search history.

(56) References Cited

U.S. PATENT DOCUMENTS

| | | | |
|---|---|---|---|
| 2,631,814 A | 3/1953 | Abplanalp | 251/137 |
| 3,033,473 A | 5/1962 | Kitabayashi | 239/579 |
| 3,061,203 A | 10/1962 | Kitabayashi | 239/337 |
| 3,074,601 A | 1/1963 | Kuffer | 222/394 |
| 3,209,960 A | 10/1965 | Green | 222/394 |
| 3,600,345 A | 8/1971 | Levine et al. | 260/22 CB |
| 4,010,126 A | 3/1977 | Kuzma | 260/22 CB |
| 4,112,013 A | 9/1978 | Briggs, Jr. et al. | 260/878 R |
| 4,133,786 A | 1/1979 | Harris et al. | 260/22 CB |
| 4,335,027 A * | 6/1982 | Cremeans et al. | 528/281 |
| 4,353,126 A * | 10/1982 | Bergmann | 380/260 |
| 4,362,838 A | 12/1982 | Leep et al. | 524/444 |
| 4,365,028 A | 12/1982 | Leep et al. | 523/402 |
| 4,535,126 A | 8/1985 | Iida | 525/106 |
| 4,572,406 A | 2/1986 | Pratt et al. | 222/39 |
| 4,923,097 A | 5/1990 | Bartlett | 222/394 |
| 4,981,730 A | 1/1991 | Zaleski | 427/393.5 |
| 4,983,716 A | 1/1991 | Rao et al. | 528/272 |
| 5,027,985 A | 7/1991 | Abplanalp | 222/402.1 |
| 5,130,373 A | 7/1992 | Ashihara et al. | 525/193 |
| 5,348,992 A | 9/1994 | Pearson et al. | 523/523 |
| 5,397,602 A | 3/1995 | Martz et al. | 427/343.5 |
| 5,536,532 A | 7/1996 | Oaks | 427/307 |
| 5,603,939 A * | 2/1997 | Ser | 424/401 |
| 5,811,489 A | 9/1998 | Shirai et al. | 525/66 |
| 5,863,646 A | 1/1999 | Verardi et al. | 428/323 |
| 6,203,913 B1 | 3/2001 | Kondos et al. | 428/423.1 |
| 6,207,224 B1 | 3/2001 | O'Neil | 427/140 |
| 6,225,402 B1 | 5/2001 | O'Callaghan et al. | 524/834 |
| 6,245,695 B1 * | 6/2001 | Maruo et al. | 442/136 |
| 6,277,912 B1 | 8/2001 | Ashihara et al. | 525/65 |
| 6,297,312 B1 | 10/2001 | Wang | 524/507 |
| 6,333,378 B1 | 12/2001 | Clark et al. | 524/560 |

FOREIGN PATENT DOCUMENTS

| | | |
|---|---|---|
| EP | 0 292 702 A1 | 11/1988 |
| EP | 0 610 754 A1 | 8/1994 |
| GB | 986284 | 3/1965 |
| GB | 1049129 | 11/1966 |
| WO | WO 02/057232 A2 | 7/2002 |

OTHER PUBLICATIONS

OPC Polymers, OPC Technical Service Bulletin—"Polychem 7060-V-60".
Dock Resins Corporation, DORESCO(R) AC423-17, Jan. 9, 2002, 1 page.
International Search Report for PCT/US03/24714, 3 pages.
PCT Written Opinion dated Oct. 14, 2004, International Application No. PCT/US03/24714, International Filing Date Aug. 8, 2003, corresponding to U.S. Appl. No. 10/637,155.
Abstract for Japanese Patent No. JP 57102937, Inventor: Morinaga Shigeki, Title: "Chlorinated Polyolefin Coating Material", Jun. 26, 1982, 1 page.

* cited by examiner

*Primary Examiner*—Margaret G. Moore
(74) *Attorney, Agent, or Firm*—Robert E. McDonald; Arthi K. Tirey; Vivien Y. Tsang

(57) ABSTRACT

A pressurized paint product that includes an aerosol paint composition disposed in a container. The aerosol paint composition includes volatile organic solvents, an acrylic modified alkyd resin, an acrylic modified chlorinated polyolefin resin, propellant, and a colorant.

11 Claims, 1 Drawing Sheet

AEROSOL PAINT COMPOSITION FOR ADHERENCE TO PLASTIC

CROSS-REFERENCE TO RELATED APPLICATION

This application claims the benefit of U.S. provisional patent application No. 60/402,859 filed on Aug. 10, 2002, the entirety of which is hereby incorporated by reference.

BACKGROUND OF THE INVENTION

This invention relates to paint compositions in general and, more particularly, to paint compositions that can be dispensed in an aersosol spray from a sealed and pressurized container.

Conventional aerosol paint compositions adhere poorly to plastic substrates. The aerosol paint composition of the present invention addresses this deficiency in conventional aerosol paint compositions.

Examples of prior art aerosol paint compositions are disclosed in U.S. Pat. Nos. 4,362,838; 4,365,028; 4,923,097; and 5,348,992.

BRIEF DESCRIPTION OF THE DRAWING

The features, aspects, and advantages of the present invention will become better understood with regard to the following description, appended claims, and accompanying drawing where:

DETAILED DESCRIPTION OF THE PREFERRED EMBODIMENTS

Figure 1:
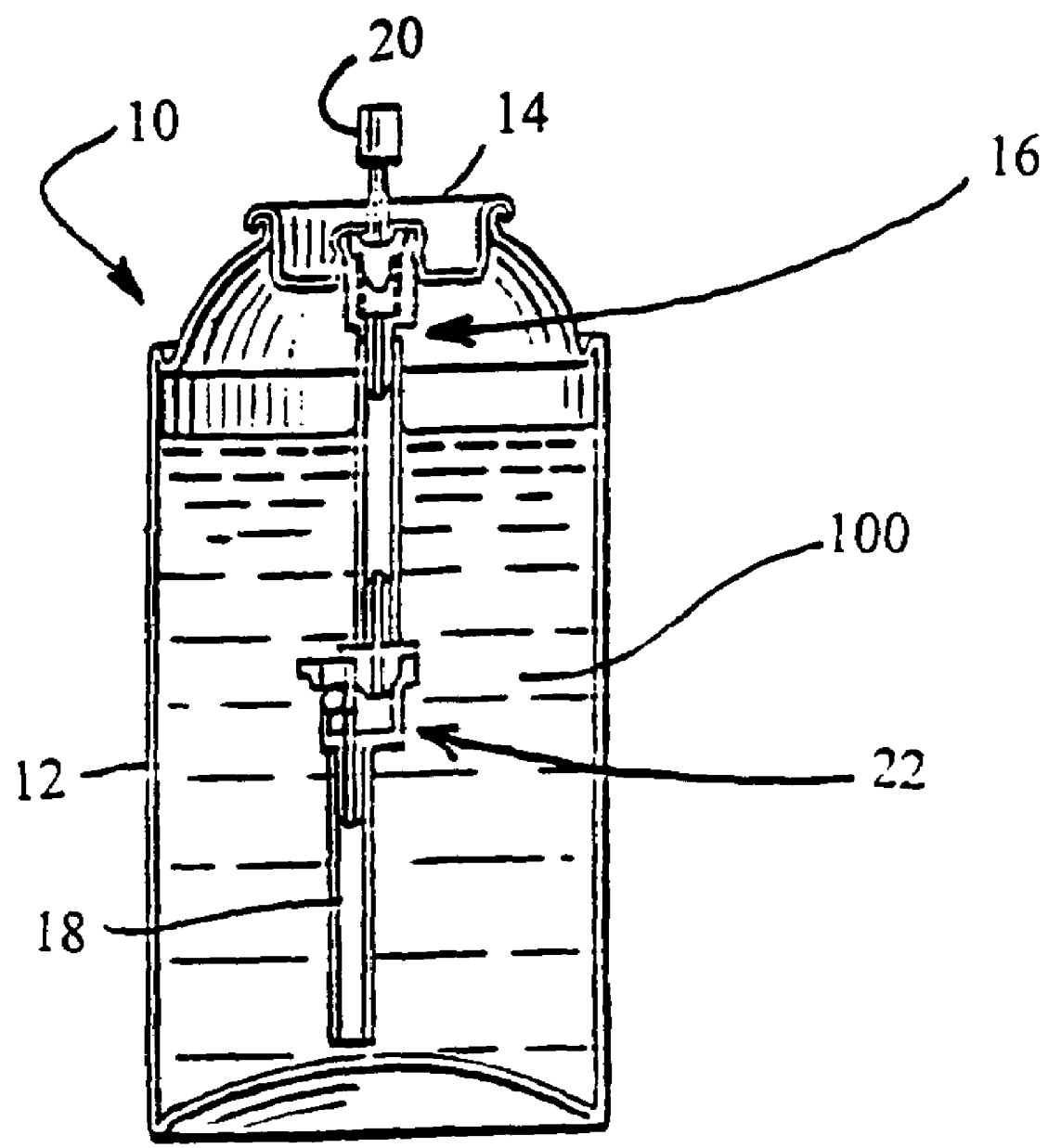
FIG. 1 shows a schematic view of an aerosol container charged with an aerosol paint composition embodied in accordance with the present invention.

As used herein, the term "volatile organic solvent" shall mean an organic solvent capable of vaporizing at atmospheric pressure and a temperature in a range from about 35° F. to about 140° F.

The aerosol paint composition of the present invention generally comprises a solvent-borne paint composition and an aerosol propellant. The aerosol paint composition is substantially free of water.

The solvent-borne paint composition generally comprises a solvent system, a resin system and colorant.

The solvent system comprises at least one volatile organic solvent, more preferably a mixture of at least two volatile organic solvents. Volatile organic solvents that may be used in the solvent system include alcohols, such as methanol, ethanol, isopropanol, 2-butoxy ethanol, and n-butyl alcohol; ketones, such as acetone, methyl ethyl ketone, methyl propyl ketone, and methyl isobutyl ketone; propylene and ethylene glycol ethers and acetates; aliphatic and aromatic hydrocarbons and naphthas; petroleum and wood distillates; turpentine; pine oil, and the like. Mixtures of the foregoing solvents may also be used and are in fact preferred. Preferably, the solvent system comprises acetone, toluene, xylene and at least one alcohol and at least one ketone.

The amount of the solvent system present in the solvent-borne paint composition is at least 20 weight percent of the total weight of the solvent-borne paint composition. Preferably, the amount of the solvent system present in the solvent-borne paint composition is from about 20 to about 50 weight percent, more preferably from about 20 to about 30 weight percent of the total weight of the solvent-borne paint composition.

The resin system comprises an acrylic modified alkyd resin and an acrylic modified chlorinated polyolefin resin. This combination of resins can provide coatings which are convenient to apply as aerosol products and which provide excellent adhesion to plastics, as well as good initial gloss and gloss retention and durability. These properties cannot be achieved with either resin by itself.

The acrylic modified alkyd resin is comprised of an acrylic portion and an alkyd portion.

The acrylic portion is formed from monomers comprising at least one acrylic monomer and can be a homopolymer or a copolymer. Preferably, the acrylic portion is a copolymer formed from at least one acrylic monomer and a vinyl aromatic hydrocarbon, such as styrene, a methyl styrene or other lower alkyl styrene, chlorostyrene, vinyl toluene, vinyl naphthalene, or divinyl benzene. More preferably, the acrylic portion is formed from at least one acrylic monomer and vinyl toluene. Suitable acrylic monomers include any compounds having acrylic functionality, such as alkyl (meth)acrylates, acrylic acids, as well as aromatic derivatives of (meth)acrylic acid, acrylamides and acrylonitrile. Typically, the alkyl (meth)acrylate monomers (commonly referred to as "alkyl esters of (meth)acrylic acid") will have an alkyl ester portion containing from 1 to 12, preferably about 1 to 5, carbon atoms per molecule. Suitable acrylic monomers include, for example, methyl (meth)acrylate, ethyl (meth)acrylate, butyl (meth)acrylate, propyl (meth) acrylate, 2-ethyl hexyl (meth)acrylate, cyclohexyl (meth) acrylate, decyl (meth)acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cycanoacrylic acid, crotonic acid, beta-acryloxy propionic acid, and beta-styryl acrylic acid. One of the preferred acrylic monomers is butyl acrylate.

The alkyd portion of the acrylic modified alkyd resin may be formed by one of the traditional processes, such as: (i.) the direct esterification of a drying oil fatty acid with a dicarboxylic acid and a polyhydric alcohol, (ii.) the indirect esterification of a drying oil by first alcoholization with a polyhydric alcohol and second esterification with a polybasic acid, or a (iii.) two-step process wherein the first step comprises the acidolysis reaction of a triglyceride oil with a trifunctional carboxylic acid or a trifunctional anhydride, and the second step comprises reacting the product of the first step with a multifunctional alcohol, as is disclosed in U.S. Pat. No. 4,983,716, which is hereby incorporated by reference.

Typical raw materials for the formation of alkyds include triglyceride oils or the fatty acids thereof. These can be selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil, tall oil, the fatty acids thereof and mixtures thereof. Particularly preferred are those oils and acids containing unsaturation in the glyceride chains. Particularly preferred are soya oil, dehydrated castor oil and linseed oil and the fatty acids thereof.

Multi-functional alcohols, and mixtures thereof, are also common raw materials for the production of alkyds. One suitable hexafunctional alcohol includes dipentaerythritol. One suitable tetrafunctional alcohol includes pentaerythritol. Suitable trifunctional alcohols include the group consisting of trimethylol propane, trimethylol ethane, glycerine, tris hydroxyethyl isocyanurate, and mixtures thereof, either alone or in combination with a difunctional alcohol selected from the group consisting of ethylene glycol, propylene glycol, cyclohexane dimethanol, and mixtures thereof. Additionally, dimethylol propionic acid can be used in combination with the trifunctional alcohol.

Another typical raw material used in the formation of alkyds is multi-functional carboxylic acids or anhydrides. Suitable trifunctional carboxylic acids include trimelletic acid, trimesic acid, 1,3,5-pentane tricarboxylic acid, citric acid and others whereas suitable trifunctional anhydrides include trimelletic anhydride, pyromelletic anhydride and others. Difunctional carboxylic acids include phthalic acid, isophthalic acid, terephthalic acid, maleic acid and fumaric acid and mixtures thereof. Mixtures of such acids and anhydrides are also acceptable.

The acrylic modified alkyd resin may be formed by contacting and reacting, under free radical polymerization conditions, the acrylic portion monomers with either the pre-formed alkyd resin or, alternatively, with the alkyd resin precursors during the formation of the alkyd resin. The acrylic modified alkyd resin may also be formed by other methods, such as first forming the acrylic portion so as to have pendant carboxy substituents (and optionally hydroxy substituents) and then reacting this polymer with a mixture of alkyd resin components or precursors, i.e., a polycarboxylic acid (or, alternatively, the corresponding anhydride), a polyhydric alcohol, and a fatty acid (or, alternatively, the corresponding triglyceride or fatty acid oil), as is disclosed in U.S. Pat. No. 4,010,126, which is hereby incorporated by reference.

A commercially available acrylic modified alkyd resin that may be used in the aerosol paint composition is POLYCHEM 7060-V-60 sold by OPC Polymers of Columbus, Ohio. POLYCHEM 7060-V-60 is an acrylic-vinyl toluene alkyd resin formed from soya oil.

The acrylic modified chlorinated polyolefin resin is comprised of an acrylic portion and a chlorinated polyolefin portion.

The acrylic portion is formed from monomers comprising at least one acrylic monomer and can be a homopolymer or a copolymer. Suitable acrylic monomers are listed above in connection with the acrylic modified alkyd resin.

The chlorinated polyolefin portion can be chlorinated polypropylene, chlorinated polybutene, chlorinated polyethylene, and mixtures thereof.

The acrylic modified chlorinated polyolefin may be formed by graft polymerizing the monomers of the acrylic portion onto the chlorinated polyolefin portion using one or more polymerization initiators, such as benzoyl peroxide, di-tert-butyl peroxide and/or azobisisobutyronitrile. Known polymerization techniques can be used for the graft polymerization. A method of forming such an acrylic modified chlorinated polyolefin is disclosed in U.S. Pat. No. 5,603,939, which is hereby incorporated by reference.

A commercially available acrylic modified chlorinated polyolefin that may be used in the aerosol paint composition is DORESCO® AC439-1, which is available from Dock Resins Corporation of Linden, N.J.

The weight solids ratio of acrylic modified chlorinated polyolefin to acrylic modified alkyd resin can vary from about 9 to 1 to about 1 to 9, but for many applications preferably, the ratio (on a weight solids basis) of acrylic modified chlorinated polyolefin to acrylic modified alkyd resin in the solvent-borne paint composition is from about 1.2 to 1 to about 1 to 1.2. More preferably, the ratio (on a weight solids basis) of acrylic modified chlorinated polyolefin to acrylic modified alkyd resin in the solvent-borne paint composition is preferably about 1 to 1 to about 1.2 to 1. Still more preferably, the ratio (on a weight solids basis) of acrylic modified chlorinated polyolefin to acrylic modified alkyd resin in the solvent-borne paint composition is preferably about 1.04 to 1.

The amount of the resin system present in the solvent-borne paint composition is typically at least 30 weight percent of the total weight of the solvent-borne paint composition. Preferably, the amount of the resin system present in the solvent-borne paint composition is from about 30 to about 80 weight percent, more preferably from about 40 to about 65 weight percent of the total weight of the solvent-borne paint composition.

The solvent-borne paint composition may also incorporate colorants. The colorant can comprise for example one or more of the following: titanium dioxide, carbon black, graphite, ceramic black, lamp black, antimony sulfide, black iron oxide, aluminum pastes, yellow iron oxide, red iron oxide, iron blue, phthalo blue and green, nickel titanate, dianisidine orange, dinitroaniline orange, imidazole orange, quinacridone red, violet and magenta, toluidine red, molybdate orange, and the like.

The solvent-borne paint composition of the present invention may include other ingredients, such as surfactants and dispersants, rheology modifiers, extenders, anti-skinning agents, drying agents, light stabilizers and ultraviolet light absorbers.

Suitable dispersants and surfactants can comprise any of the dispersants and surfactants readily available to the coatings industry, including the anionic and nonionic surfactants, soya lecithin, alkyl ammonium salts of fatty acids, amine salts of alkyl aryl sulfonates, unsaturated organic acids, sulfonated castor oil, mixtures of high boiling point aromatic and ester solvents, sodium salts of aryl sulfonic acid, and the like.

Suitable rheology modifiers can comprise organoclays, fumed silica, dehydrated castor oil organic derivatives, English China Clay; polyamides, polyamide modified alkyds, alkylbenzene sulphonate derivatives, aluminum, calcium and zinc stearates, calcium soyate, and the like.

Suitable extenders can comprise amorphous, diatomaceous, fumed, quartz and crystalline silica, clays, aluminum silicates, magnesium aluminum silicates. talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like.

Anti-skinning agents that may used include methyl ethyl ketoxime, o-cresol, and hydroquinone.

Drying agents, which facilitate the cure of the alkyd materials, can comprise standard metallic and rare earth driers such as cobalt, calcium, potassium, barium, zinc, manganese, tin, aluminum, zirconium and vanadium napthenates, octoates, hexanates, and isodecanoates.

The aerosol paint composition of the present invention is formed by combining the solvent-borne paint composition (described above) with additional solvents and then aerosolizing the combination with the propellant.

The propellant is a liquafiable gas having a vapor pressure sufficient to propel the aerosol paint composition from the container. Preferably, the propellant is selected from the group consisting of ethers, such as dimethyl ether (DME)

and diethyl ether; C1–C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures of the foregoing. More preferably, the propellant is a blend of n-butane and propane.

The amount of the propellant present in the aerosol paint composition is typically at least 10 weight percent and preferably from about 10 to about 40 weight percent, more preferably from about 15 to about 25 weight percent of the total weight of the aerosol paint composition. When the propellant is present in an amount of from about 15 to about 25 weight percent, an initial pressure of between about 40 pounds per square inch and 70 pounds per square inch is obtained in the container.

The amount of volatile organic solvent present in the aerosol paint composition is at least 30 weight percent of the total weight of the aerosol paint composition. Preferably, the amount of volatile organic solvent present in the aerosol paint composition is from about 30 to about 60 weight percent, more preferably from about 45 to about 55 weight percent of the total weight of the aerosol paint composition.

The amount of polymer resin present in the aerosol paint composition is at least 10 weight percent of the total weight of the aerosol paint composition. Preferably, the amount of polymer resin present in the aerosol paint composition is from about 10 to about 30 weight percent, more preferably from about 15 to about 25 weight percent of the total weight of the aerosol paint composition.

Preferably, the solvent-borne paint composition of the present invention is made in a batch process at or below a temperature of 70° F. The solvent system is charged one solvent at a time to a mixing vessel and blended for a short period of time to achieve a state of equilibrium. The acrylic modified chlorinated polyolefin and the acrylic modified alkyd resin are charged to the mixing vessel and mixed with high shear dispensers to achieve complete dissolution in the solvent system. The colorant and the other ingredients are then added in stepwise fashion and thoroughly mixed therein. The resulting solvent-borne paint composition is filtered through a 10 micron filter bag to remove any large agglomerations. The solvent-borne paint composition is then added to a container, such as container 10 shown in FIG. 1, and then the propellant is added to form the aerosol paint composition.

Referring now to FIG. 1, the container 10 comprises a can 12, to which a valve cup 14 is secured. A valve assembly 16 with a dip tube 18 connected thereto is secured to the valve cup 14. The dip tube 18 extends into the interior of the can 12 and is in contact with the aerosol paint composition, which is designated by the numeral 100. The can 12 may be composed of aluminum or more preferably tin plated steel. The valve cup 14 may be sealed to the can 12 and the propellant charged through the valve assembly 16, or the can 12 may be charged with the propellant under the valve cup 14, and then the valve cup 14 sealed to the can 12. An actuator 20 is then connected to the valve assembly 16.

Various valves, dip tubes and actuators may be used to spray the aerosol paint composition. Preferably, the dip tube 18 is a standard dip tube having a diameter of about 0.147 inches. The valve assembly 16 may be either a "female" aerosol valve or a "male" aerosol valve. Examples of "female" aerosol valves that may be used in the present invention are disclosed in U.S. Pat. Nos. 3,033,473; 3,061, 203; 3,074,601; 3,209,960; and 5,027,985. Examples of "male" aerosol valves that may be used in the present invention are disclosed in U.S. Pat. Nos. 2,631,814, and 4,572,406. Preferably, the valve assembly 16 is a "female" valve with a spray controller 22 having a construction as disclosed in U.S. Pat. No. 4,572,406, which is hereby incorporated by reference. The spray controller 22 permits the aerosol paint composition 100 to be dispensed when the container 10 is inverted.

The aerosol paint composition of the present invention adheres to a variety of different surfaces, including metal, wood and especially plastic.

The invention will be better understood by reference to the following example:

EXAMPLE 1

A gloss white batch of the inventive solvent-borne paint composition was formed in a mixing vessel. The batch was formed from the following components in the noted amounts, where parts are parts by weight.

| | |
|---|---:|
| (a.) Toluene | 88.619 parts |
| (b.) POLYCHEM 7060-V-60 | 216.158 parts |
| (c.) Organoclay | 3.643 parts |
| (d.) Methanol | 1.193 parts |
| (e.) SUSPENO ® 201-T | 4.075 parts |
| (f.) DYSPERBYK ®-163 | 2.082 parts |
| (g.) BYK P104-S | 2.078 parts |
| (h.) Titanium Dioxide | 250.000 parts |
| (i.) DORESCO ® AC439-1 | 223.960 parts |
| (j.) 2-Butoxy Ethanol | 52.558 parts |
| (k.) Methyl Isobutyl Ketone | 38.323 parts |
| (l.) N-Butyl Alcohol | 9.807 parts |
| (m.) Xylene | 30.537 parts |
| (n.) TINUVIN ® 292 | 1.663 parts |
| (o.) TINUVIN ® 328 | 1.663 parts |
| (p.) Acetone (Dimethyl Ketone) | 24.287 parts |
| (q.) Methyl Ethyl Ketoxime | 0.970 parts |
| (r.) 12% cobalt drier | 0.291 parts |
| (s.) 12% Manganese Carboxylate | 0.195 parts |
| (t.) Silicon anti-flooding solution | 0.486 parts |
| (u.) lampblack | 0.300 parts |
| Total | 952.888 parts |

Where:
(a.) POLYCHEM 7060-V-60 is an acrylic/vinyl toluene modified alkyd available from Ohio Polychem.
(e.) SUSPENO ® 201-T is an organic anti-settling, anti-sag rheological additive available from Poly-Resyn, Inc., located in Dundee, IL 60118.
(f.) DYSPERBYK ®-163 is a high molecular weight block copolymer with pigment affinic groups that is used for wetting and dispersing pigments and is available from BYK-Chemie USA, located in Wallingford, Connecticut.
(g.) BYK ®-P 104 S is a lower molecular weight unsaturated polycarboxylic acid polymer with a polysiloxane copolymer that is used for wetting and dispersing pigments and is available from BYK-Chemie USA, located in Wallingford, Connecticut.
(i.) DORESCO ® AC439-1 is an acrylic-modified chlorinated polyolefin resin available from Dock Resins
(n.) TINUVIN ® 292 is a light stabilizer [bis (1,2,2,6,6-pentamethyl-4-piperidinl)sebacate] available from Ciba-Geigy.
(o.) TINUVIN ® 328 is a UV absorber [2-(3',5'-di-n-pentyl-2'-hydroxyphenyl)-benzotriazole] available from Ciba-Geigy.

35 parts by weight of the batch of the solvent-borne paint composition, 10 parts by weight of toluene and 30 parts by weight of acetone were then charged to an aerosol container composed of tin-plated steel and pressurized with 25 parts by weight of a blend of n-butane and propane to thereby yield a batch of an aerosol paint composition. The aerosol paint composition can be applied to a suitable substrate, such as plastic, and allowed to dry or cure.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. An aerosol paint product comprising:
   (a) a container comprising a can, a valve cup with a valve assembly, a dip tube and an actuator; and
   (b) an aerosol paint composition disposed within said container, said aerosol paint composition comprising:
      at least 30 weight percent of at least one volatile organic solvent;
      at least 10 weight percent of a resin system comprising an acrylic modified alkyd resin and an acrylic modified chlorinated polyolefin resin;
      at least 10 weight percent of an aerosol propellant; and
      a colorant.

2. The aerosol paint product of claim 1 wherein the propellant is selected from the group consisting of ethers, C1–C4 saturated hydrocarbons, hydrofluorocarbons, and mixtures of the foregoing.

3. The aerosol paint product of claim 1 wherein the propellant is a blend of n-butane and propane.

4. The aerosol paint product of claim 1 wherein the aerosol paint composition comprises a drying agent.

5. The aerosol paint product of claim 1 wherein the acrylic modified alkyd resin and the acrylic modified chlorinated polyolefin resin are present at a weight solids ratio between about 9 to 1 and 1 to 9.

6. The aerosol paint product of claim 1 wherein the acrylic modified alkyd resin and the acrylic modified chlorinated polyolefin resin are present at a weight solids ratio between about 1.2 to 1 and 1 to 1.2.

7. The aerosol paint product of claim 1 wherein the paint product is substantially free of water.

8. The aerosol paint product of claim 1 wherein the paint product also comprises a light stabilizer.

9. The aerosol paint product of claim 1 wherein the can is comprised of tin plated steel.

10. A process of coating a substrate, which process comprises:
    (i.) providing an aerosol paint product comprising:
       (a) a container comprising a can, a valve cup with a valve assembly, a dip tube and an actuator; and
       (b) an aerosol paint composition disposed within said container, said aerosol paint composition comprising:
          at least 30 weight percent of at least one volatile organic solvent;
          at least 10 weight percent of a resin system comprising an acrylic modified alkyd resin and an acrylic modified chlorinated polyolefin resin;
          at least 10 weight percent of an aerosol propellant; and
          a colorant;
    (ii.) activating the valve assembly to create an aerosol spray of the aerosol paint composition;
    (iii.) directing the spray to apply the paint composition onto the substrate; and
    (iv.) allowing the paint composition to cure or dry.

11. The process of claim 10 wherein the substrate is plastic.

* * * * *